(12) United States Patent  
Lee

(10) Patent No.: US 7,721,158 B2
(45) Date of Patent: May 18, 2010

(54) CUSTOMIZATION CONFLICT DETECTION AND RESOLUTION

(75) Inventor: Michael Lee, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 11/810,123

(22) Filed: Jun. 4, 2007

(65) Prior Publication Data

US 2008/0301486 A1    Dec. 4, 2008

(51) Int. Cl.
 G06F 11/00 (2006.01)
(52) U.S. Cl. .................. 714/48; 714/38; 717/168; 717/170
(58) Field of Classification Search .............. 714/38, 714/48; 717/168, 170
See application file for complete search history.

(56) References Cited

U.S. PATENT DOCUMENTS

| | | | | |
|---|---|---|---|---|
| 6,751,719 | B1* | 6/2004 | Peloquin et al. | 711/210 |
| 6,915,285 | B2 | 7/2005 | Gray et al. | 706/49 |
| 7,424,602 | B2* | 9/2008 | Reiss et al. | 713/1 |
| 7,661,025 | B2* | 2/2010 | Banks et al. | 714/12 |
| 2002/0029376 | A1* | 3/2002 | Ambrose et al. | 717/113 |
| 2002/0062463 | A1 | 5/2002 | Hines | 714/38 |
| 2002/0129352 | A1* | 9/2002 | Brodersen et al. | 717/174 |
| 2003/0167422 | A1* | 9/2003 | Morrison et al. | 714/38 |
| 2003/0220966 | A1 | 11/2003 | Hepper et al. | 709/203 |
| 2004/0123285 | A1* | 6/2004 | Berg et al. | 717/174 |
| 2004/0181291 | A1 | 9/2004 | Plaisted et al. | 700/1 |
| 2004/0181534 | A1* | 9/2004 | Mortensen et al. | 707/100 |
| 2004/0181773 | A1* | 9/2004 | Mortensen et al. | 717/101 |
| 2005/0027755 | A1 | 2/2005 | Shah et al. | 707/201 |
| 2005/0055382 | A1 | 3/2005 | Ferrat et al. | 707/201 |
| 2005/0091346 | A1* | 4/2005 | Krishnaswami et al. | 709/220 |
| 2005/0216902 | A1* | 9/2005 | Schaefer | 717/168 |
| 2006/0026568 | A1 | 2/2006 | Wiltamuth et al. | 717/122 |
| 2006/0195453 | A1* | 8/2006 | Plaisted et al. | 707/10 |
| 2006/0293934 | A1* | 12/2006 | Tsyganskiy et al. | 705/7 |
| 2008/0127087 | A1* | 5/2008 | Brookins et al. | 717/121 |

OTHER PUBLICATIONS

Klein & Dellarocas, M. & C.; "A Knowledge-Based Approach to Handling Exceptions in Workflow Systems," http://ccs.mit.edu/papers/ccswp203/, pp. 1-10.
Myers & Morley, K. & D.; "Conflict Management for Agent Guidance", AAMAS '02, Italy. 2 pgs.
Capra et al.; "CARISMA: Context-Aware Reflective Middleware System for Mobile Applications" IEEE Transactions on Software Engineering. pp. 1-17.
Merge Replication Conflict Detection and Resolution, Microsoft Corp. 2007, 2 pgs.

* cited by examiner

Primary Examiner—Joshua A Lohn
(74) Attorney, Agent, or Firm—Westman, Champlin & Kelly, P.A.

(57) ABSTRACT

A computer-implemented method is disclosed for managing customization conflicts. The method includes receiving an indication of a conflict. The conflict is indicative of an error created by a customization of a core application. A customization correction is identified as a remedy for the customization conflict. The customization correction is transmitted over a network to a party affiliated with a system affected by the customization conflict.

13 Claims, 4 Drawing Sheets

CUSTOMIZATION CONFLICT DETECTION AND RESOLUTION

BACKGROUND

Currently, software that is customizable is difficult if not impossible to test in all of its potential configurations. In many cases, one reason for this is that much of the code running as part of the system is authored by developers from different organizations tailoring the product in ways unforeseeable to the developers writing the customizable core system and to other developers customizing the system. Currently, there is no good way for a customizable system, especially a large-scale implementation of such a system, to efficiently identify incompatible customizations and provide corresponding solutions to heal the system so as to keep functionality in line with expectations.

The discussion above is merely provided for general background information and is not intended for use as an aid in determining the scope of the claimed subject matter.

SUMMARY

A computer-implemented method is disclosed for managing customization conflicts. The method includes receiving an indication of a conflict. The conflict is indicative of an error created by a customization of a core application. A customization correction is identified as a remedy for the customization conflict. The customization correction is transmitted over a network to a party affiliated with a system affected by the customization conflict.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Figure 1:
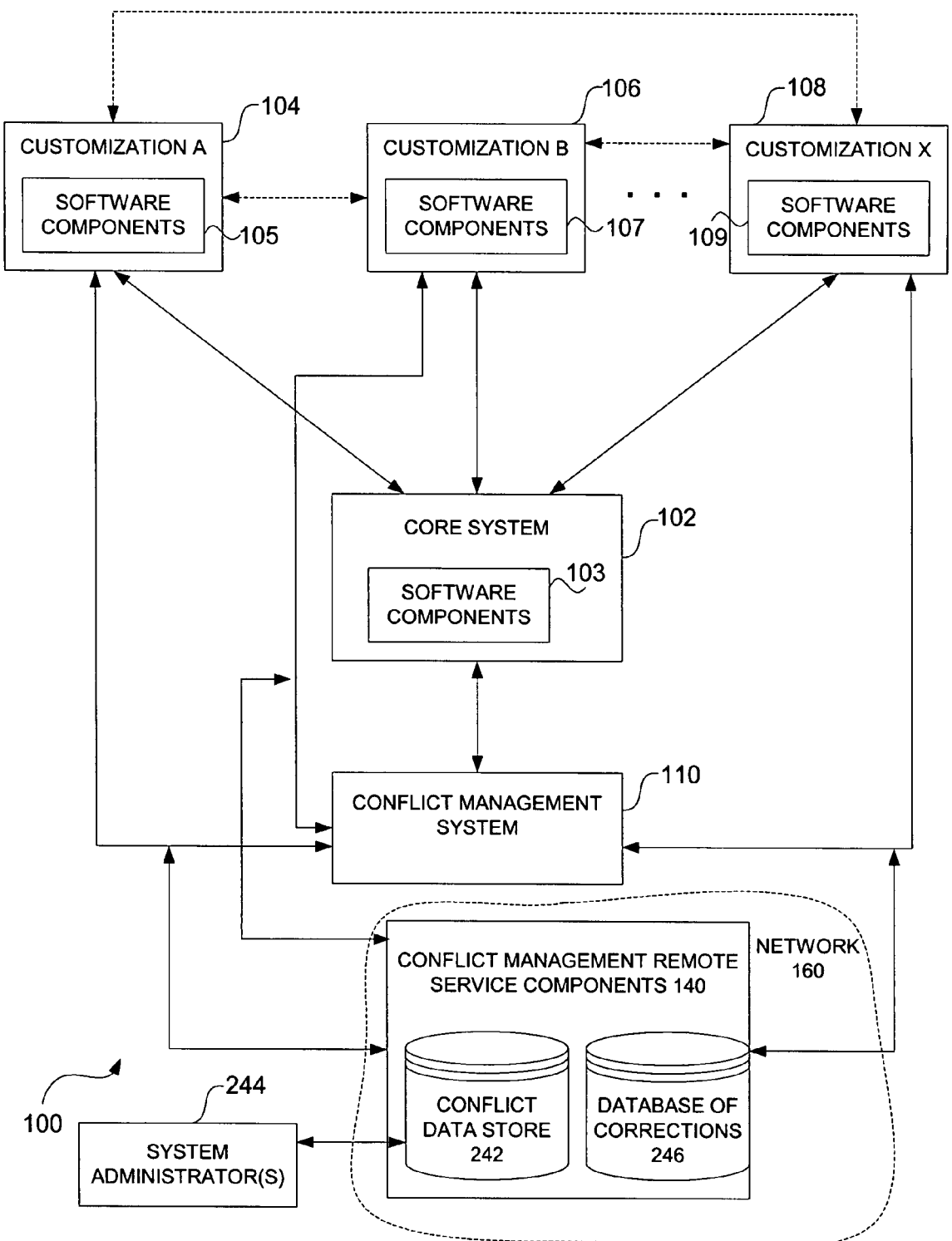
FIG. 1 is a schematic representation of a software customization environment 100.

FIG. 1 is a schematic representation of a software customization environment 100 in which embodiments described herein may be implemented. Environment 100 is only one example of a suitable computing environment and is not intended to suggest any limitation as to scope of use or functionality. Neither should environment 100 be interpreted as having any dependency or requirement relating to any one or combination of illustrated components.

Environment 100 includes a core system 102 (i.e., a core application) having related software components 103. Also included is a plurality of customizations of core system 102. An actual implementation may include more or fewer than the illustrated number of customizations without departing from the scope of the present invention. For illustrative purposes only, environment 100 is shown as including customizations 104, 106 and 108 having related software components 105, 107 and 109, respectively. In one embodiment, one or more of customizations 104, 106 and 108 are remotely deployed (e.g., over a computer network) in terms of communication with the core system 102. Further, while more than one customization may be deployed on the same computing device, different customizations can also or alternatively be deployed on different computing devices. Thus, communication between customizations, and between a given customization and core system 102, can be remote (e.g., over a computer network) or direct (e.g., within the same computing device).

Many known customizable software systems are one-of-a-kind in nature in that they are customized primarily through modification of source code associated with the core system. However, there are alternatives to this scenario. One alternative is n-way customization where a given customization adds functionality to the core system without requiring significant adaptation of the core system source code. In an n-way customizable system, the core system as well as customizations may be customized. Allowing customizations to be customized through additional customizations makes avoiding conflicts much more complex and a systematic way of resolving conflicts a necessity. In one embodiment, not by limitation, customizations 104, 106 and 108 are n-way customizations that are configured to pass data to and from core system 102 as necessary to support customization functionality.

Those skilled in the art will appreciate that interactions between a customization and core system 102 and/or between customizations can be conducted in a variety of different ways. To give an example, interaction might be based on a scheme of event publishing and subscription. For example, components 105 can be configured to receive and respond to indications of events from core system 102, and to provide an indication to component 107 when a certain event occurs within customization 104. Event publishing and subscription is but one of many examples of interaction schemes that should be considered within the scope of the present invention.

The detection and resolution of software conflicts within environment 100 is a challenge. There are a variety of reasons of why this might be true. For example, it is conceivable and reasonable that customization 104, 106, and/or 108 may be created and/or supported by software developers other than the developers responsible for core system 102. Further, the developers association with one customization may be different than the developers associated with one or more of the other customizations. Thus, within a given implementation, there can be abundant functional interaction across code created by developers that are relatively unfamiliar with one another. Under the circumstances, detecting, tracing and resolving conflicts is not a particularly simple undertaking.

To address conflicts within environment 100, a conflict management system 110 is provided. System 110 is illustrated as being completely separate from core system 102. This need necessarily be the case. In one embodiment, at least some components of system 110 (e.g., conflict detection components) are implemented as part of core system 102 and/or as part of one or more of the customizations. Further, in one embodiment, at least some components of system 110 are implemented as remote service components 140 accessible over a network 160 (e.g., web service components configured for interaction with system 110, system 102 and/or one or more of the customizations).

In one embodiment, conflict management system 110 and its related remote service components 140 together support three different phases of conflict management processing, namely: 1) conflict detection; 2) conflict analysis; and 3) conflict correction/resolution.

Figure 2A:
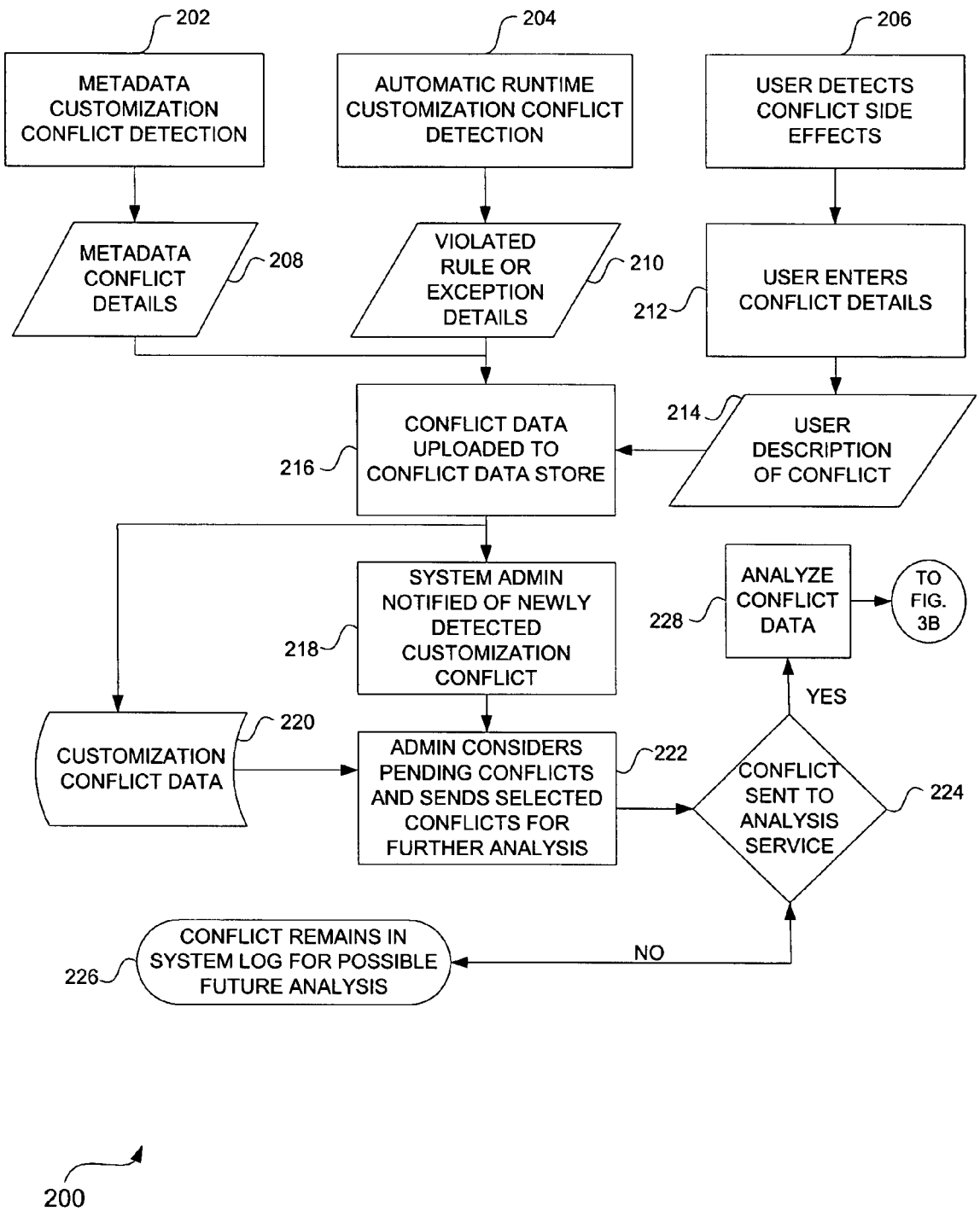
FIGS. 2A and 2B (FIG. 2) collectively represent a flow chart diagram demonstrating steps associated with a process for customization conflict detection and resolution.
Figure 2B:
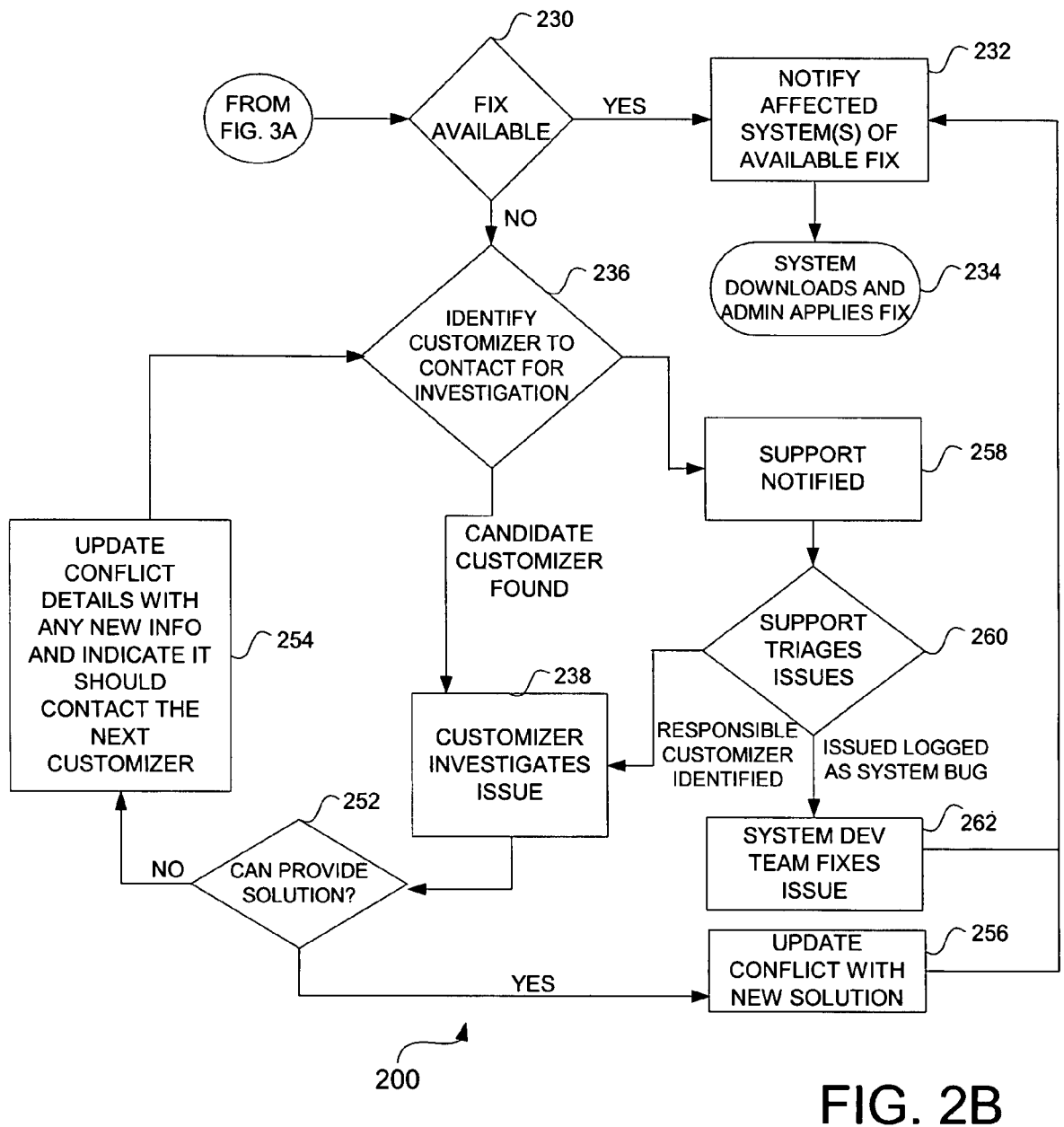

FIGS. 2A and 2B (collectively referred to herein as FIG. 2) together represent a block flow diagram demonstrating steps associated with the three phases of error management processing. The three phases are identified collectively in FIG. 2 as functionality 200, which refers to the functionality of conflict management system 110 (and related remote components 140) within software customization environment 100. Functionality 200 is only one example of an error management scheme within the scope of the present invention. FIG. 2 is not intended to suggest any limitation as to scope of use or functionality. Neither should functionality 200 be interpreted as having any dependency or requirement relating to any one or combination of illustrated or suggested functions or components.

Functionality 200 illustratively begins with a conflict detection phase. In one embodiment, this means a phase in which customization conflicts are detected. Conflict management system 110 illustratively includes a first set of components for supporting an automated detection of conflicts, and a second set of components for supporting a manual detection of conflicts (e.g., methods incorporating user involvement). Portions or all of these components may be deployed anywhere within environment 100 including, but not limited to, as part of components 103, 105, 107 and/or 109 (or from any computing device related thereto).

In one embodiment, customized code components 105, 107 and/or 109 are configured, at least in some circumstances, to run in response to an event, such as an event that occurs within core system 102 or within one of the other customizations. In at least these circumstances, in one embodiment, an automated conflict detection component is illustratively configured to detect unexpected side effects resulting from the execution of the customized code (e.g., such as unhandled exceptions thrown by event handlers). Those skilled in the art will appreciate that automatic conflict detection can be as simple as this type of monitoring of event handling. Alternatively, it can be more complex, such as tracking state changes caused by one or more customizations, and then ensuring that the state changes are acceptable (e.g., in line with applicable business rules, system settings, etc.). These are but two of many examples of automatic conflict detection that should be considered within the scope of the present invention.

In one embodiment, system 110 is configured to detect conflicts during an installation of a customization. For example, conflicts between customizations that are in static form and expressed as changes in the structure of components of core system 102 can be detected when customizations are installed.

In one embodiment, system 110 is configured to enable users to identify or at least flag suspected conflicts so that corresponding information can be passed on for analysis and possible resolution. In one embodiment, a user interface is provided (e.g., provided in core system 102 or in a customization) to support a user in creating a notification of a conflict. The user interface illustratively provides means for inputting a description of observed side effects and/or what the user was doing when the side effects were likely introduced. In one embodiment, this and/or other information is automatically collected and transmitted as a supplement to the notification. Additional information that can be manually or automatically collected and transmitted as part of the notification includes information as to what customizations are installed and, potentially, which executed most recently and/or other clues as to which customization might be most likely to be incompatible.

In the context of the flow of functionality 200 illustrated in FIG. 2, conflict detection begins with step 202, 204 and/or 206. In accordance with step 202, an automated conflict detection component (e.g., deployed as part of components 103, 105, 107 and/or 109) detects a metadata customization conflict and generates corresponding conflict details 208. Those skilled in the art will appreciate that a metadata conflict can take any of a variety of forms. In one embodiment, not by limitation, a metadata conflict pertains to an inconsistency in any static metadata value that might be queried (e.g., an inconsistency in a type, field, form, control, property, etc.). For example, if a given customization makes a metadata change (e.g., eliminates a method from a class, adds a control to a form, eliminates a field) that changes something that another customization depends on, then a conflict will arise, which is illustratively detected and recorded.

In accordance with step 204, an automated conflict detection component (e.g., deployed as part of components 103, 105, 107 and/or 109) detects a runtime customization conflict and generates corresponding conflict details 210. Those skilled in the art will appreciate that a runtime conflict can take any of a variety of forms. A runtime conflict may pertain to any inconsistency in runtime logic. For example, a runtime error might pertain to an inconsistency relative to assumptions about the appropriate state of the system. Or, it might pertain simply to a generated runtime exception. Or, it might pertain to a business data corruption (e.g., a financial transaction that is incorrectly taxed twice). These are only a few examples of the many different runtime customization conflict errors for which a detection component can be configured to monitor.

In accordance with block 206, a user notices a side effect of a customization conflict (e.g., a financial transaction that is incorrectly taxed twice). In accordance with block 212, the user creates a report pertaining to the potential conflict. In one embodiment, the user manually enters information about the potential conflict into the report. Also or alternatively, relevant information is automatically associated with the user-report (e.g., an automatically generated log of the state of the user's system, etc.). The user-generated report, including manually and/or automatically derived content, is represented within FIG. 2 as information 214.

In accordance with step 216, conflict data (i.e., data 208, 210 and/or 212) is uploaded from associated conflict detection components (e.g., system 110 components deployed as part of components 103, 105, 107 and/or 109) to a conflict data store 242. In one embodiment, conflict management remote services components 140 are part of a network-accessible service (e.g., a web service) that operates as part of conflict management system 110. Conflict data store 242 is illustratively a database maintained in association with the network-accessible service.

In one embodiment, in the case where the conflict is detected by automated detection logic, as an optional step in the process, the user is prompted to approve the transmission of a conflict notification and/or corresponding data. If approved or if this step is skipped, a conflict notification and/or corresponding data is uploaded to data store 242 for subsequent processing.

In one embodiment, in the case that the user detects and reports a conflict (e.g., through a user interface provided within the core system application), the user may be asked to approve transmission of the data (e.g., in the user interface). If the user chooses not to report the conflict, the collected data is illustratively not uploaded for further analysis. However, in one embodiment, an administrator of the user's system is given the option to log all conflicts to a central log. If the system has this functionality and if the administrator elects to enable it, then unreported conflicts (and/or reported conflicts) are logged for future examination by the administrator. The administrator can illustratively upload and submit any conflicts for further processing (e.g., upload a corresponding conflict notification and related data to data store 242) if he or she chooses.

The flow of functionality 200 transitions into a conflict analysis phase. In one embodiment, analysis is handled primarily by conflict management remote service components 140, which, in one embodiment, are part of a message-based conflict resolution system associated with the sponsor of core system 102. Through components 140, investigations of customization incompatibilities are managed through interactions with clients (e.g., sponsors of deployed customized solutions).

In one embodiment, in accordance with block 218, upon the uploading of conflict data to data store 242, a system administrator associated with the administration of remote service components 140 is notified about the new customization conflict. The administrator is designated in environment 100 by block 244. Administrator 244 may be a software-implemented component but, in one embodiment, is a human being.

In one embodiment, in addition to the notification, administrator 244 is also provided with corresponding customization conflict data 220. Data 220 may be limited to the data that was uploaded to data store 242 (e.g., data 208, 210 and/or data 212). However, data 220 may also or alternatively include other data related to the conflict.

In accordance with block 222, administrator 244 considers pending (e.g., previously reported) conflicts and identifies selected conflicts as worthy of further analysis. In that regard, as is indicated by block 224, only some reported conflicts are advanced for further analysis. If a conflict is not advanced, then, in accordance with block 226, the reported conflict remains in the system to be considered for possible future analysis. If a conflict is advanced, then, as is indicated by block 228, the data associated with the conflict (e.g., data 208, 210, 214 and/or 220) is passed on for analysis.

In light of the conflict data, in accordance with block 230, a determination is made as to whether any correction in a database 246 is related. In one embodiment, one or more heuristics are employed to classify the conflict. Based on this analysis, a reported conflict is illustratively assigned to one of three categories: 1) known—there is a corresponding solution in the correction database; 2) unknown—no solution in the database but there is a similar correction; and 3) unknown and dissimilar to anything in the correction database.

In accordance with block 232, if analysis determines that the reported conflict matches a known conflict for which there is a solution in database 246, then the sponsors of affected system or systems (e.g., sponsors of systems associated with affected customization 104, 106 and/or 108) are notified. In accordance with block 234, these sponsors downloaded the solution and is installed or otherwise acted upon by an administrator (e.g., the solution is downloaded to the affected customization system and installed by an associated administrator).

If the reported conflict does not directly match a correction in database 246, then, in accordance with block 236, an attempt is made to determine a customizer (e.g., a sponsor of customization 104, 106 and/or 108) that might be in a position to help remedy the issue. In one embodiment, a candidate customizer is a customizer identified as being likely to be involved in the circumstances of the conflict. In another embodiment, a candidate customizer is a customizer that is not associated with a directly relevant match in database 246 but is associated with a correction identified as being similar.

If a candidate customizer is identifiable, then a representative of that customizer is contacted (e.g., through a messaging service such as but not limited to an email service) and provided with details of the conflict. In one embodiment, the representative is also provided with one or more possible solutions (e.g., solutions from database 246 that fall under the "similar" but not the same conflict classification).

In accordance with block 238, the customizer investigates the conflict and attempts to identify a corresponding fix or correction. In one embodiment, if the customizer is not able to provide a solution to the conflict, then, in accordance with block 254, data in database 242 and/or 246 are updated to reflect knowledge gained relative to the conflict, if any. Then, if possible, another relevant customizer is identified.

If, at block 252, the customizer can provide a solution, then, in accordance with block 256, database 242 and/or 246 are updated accordingly. Representatives of affected systems are then contacted and relevant fixes are provided to, and applied by, associated system administrators as was described previously in relation to box 232.

In one embodiment, remote service components 140 are configured to facilitate an intelligent scheme for managing the monitoring and controlling involvement of customizers in the investigation process (e.g., in accordance with blocks 236 and 238). For example, in one embodiment, restrictions are imposed that dictate how many and/or which customizers are assigned to investigate (e.g., a restriction is imposed such that only one customizer is allowed to work on a particular conflict at any given time). In one embodiment, the determination of which customizer to contact first or next is intelligently made based upon historical data, order of customization execution in the system, or other parameters that are, in one embodiment, selectable to some extent.

In one embodiment, the described processes for reporting, analyzing and correcting conflicts is adapted for implementation in the context of a messaging system (e.g., email messaging, text messaging, etc.). For example, in step 236, components 140 support a determination as to which customizer should be contacted with a message. Then, a message is sent along with conflict details and, possibly, one or more potential corresponding corrections. In one embodiment, when the customizer determines whether it can provide a correction, they simply send a message back to the service letting it know whether a solution has been identified. If a solution is found, it can be included with the message back to the service. Then, through messaging, the solution can then be propagated to affected systems as appropriate. If no solution is found, another candidate customizer can be identified (possibly based in part on knowledge gained during the unsuccessful investigation) and the process repeated.

In one embodiment, a central interface (e.g., a web interface) is illustratively made available as a tool for monitoring the status of a particular conflict resolution task (e.g., the interface provides information such as which customizer is investigating which conflict, what steps have been taken to address a particular conflict, etc.). In one embodiment, such an interface is made available at least to a system administrator 244.

In accordance with block 258, if it becomes apparent that it is unlikely that a solution will be derived from the customizers, then a notification is illustratively provided (e.g., via messaging) to a support team member associated with core system 102 (e.g., an administrator 244). In accordance with block 260, the core support representative either produces a fix/correction for the conflict (i.e., block 262) or identifies a responsible customizer and contacts that customizer with instructions (possibly but not necessarily including a potential fix or correction) for investigating the issue further. In one embodiment, the core support representative actively assists in the correction process. In one embodiment, once a correction is identified, representatives of affected systems are contacted and relevant fixes are provided to, and applied by, corresponding system administrators as was described in relation to block 232.

In one embodiment, corrections are installed proactively, for example before an error occurs. For example, corrections can be provided in the form of customization updates for systems with customizations. In one embodiment, components 140 include an updating service from which corrections are obtained for installed customizations before actual conflicts are encountered.

Figure 3:
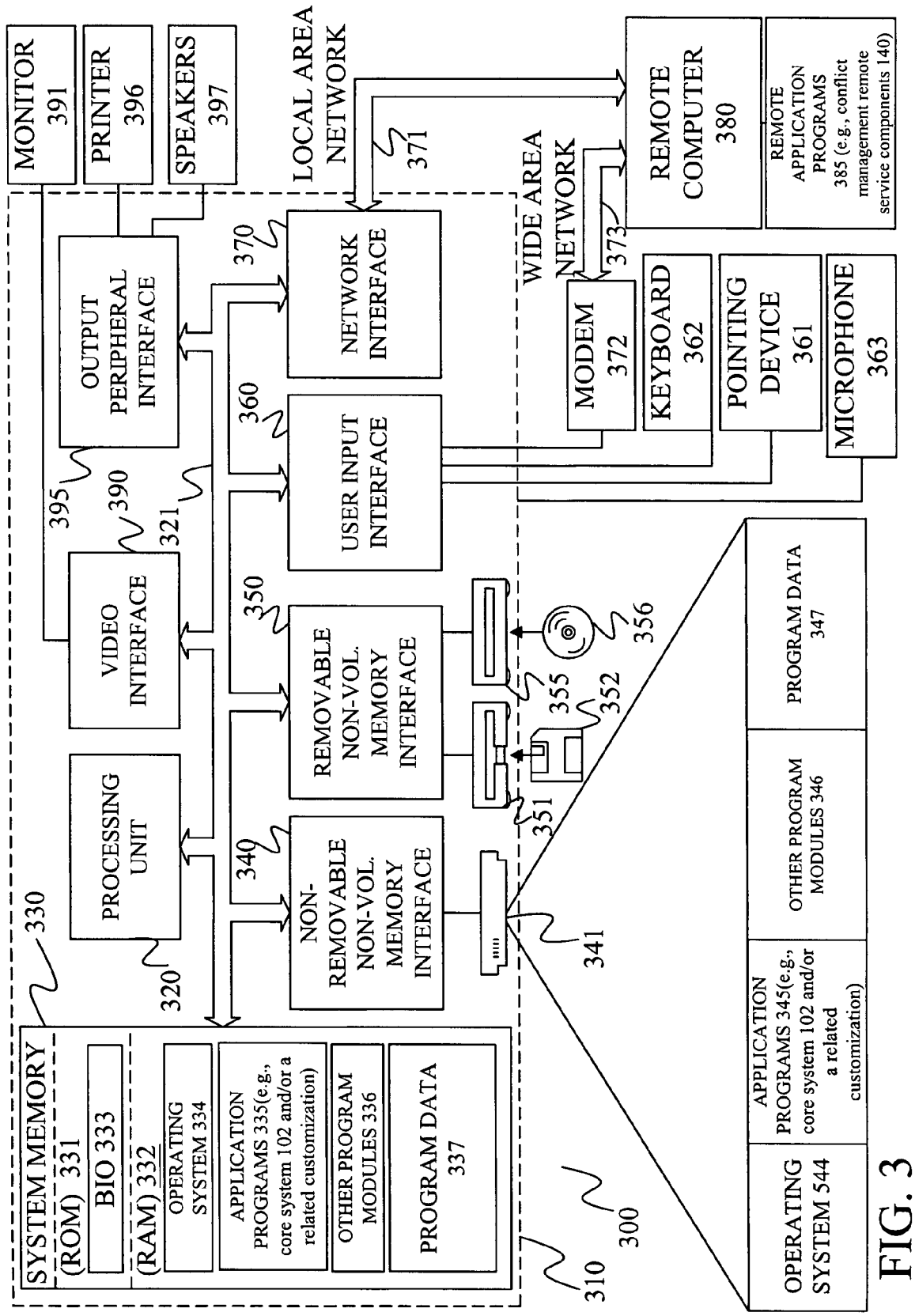
FIG. 3 is an illustrative computing environment.

With reference to FIG. 3, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337. As is indicated, programs 335 may include some or all components of core system 102 and/or a related customization. Also or alternatively, programs 335 might include some or all components of conflict management system 110 and/or remote service components 140.

The computer 310 may also include other removable/non-removable volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives, and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. As is indicated, programs 345 may include some or all components of core system 102 and/or a related customization. Also or alternatively, programs 345 might include some or all components of conflict management system 110 and/or remote service components 140.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on remote computer 380. It will be appreciated that the network connections shown are exemplary and other means of establishing a communications link between the computers may be used. As is indicated, programs 385 may include some or all components of remote service components 140. Also or alternatively, programs 385 can include some or all components of conflict management system 110 and/or core system 102 and/or a related customization.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for managing customization conflicts, comprising:
    receiving an indication of an automatically detected conflict, the conflict being caused by a metadata error created by a first customization of a core application, the metadata error being an inconsistency created when the first customization has caused a change to a static metadata component, the static metadata component being depended upon by a second customization of the core application, the first customization operating on a first computing device that is separate and distinct from a second computing device upon which the second customization operates;
    utilizing a computer processor that is a component of the computer to identify, from a database of conflict corrections, a customization correction configured to remedy the conflict; and
    transmitting, over a network, data related to the customization correction for processing to correct the metadata error.

2. The method of claim 1, wherein transmitting comprises transmitting over the Internet.

3. The method of claim 1, wherein receiving an indication of an automatically detected conflict comprises receiving an indication of a runtime conflict.

4. The method of claim 1, wherein the change to the static metadata component is an elimination of a particular method from a class, the particular method being depended upon by the second customization.

5. The method of claim 1, wherein the change to the static metadata component is an elimination of a field.

6. The method of claim 1, wherein the change to the static metadata component is an addition of a control to a form.

7. A computer-implemented method for managing customization conflicts, the method comprising:
    receiving an indication of an automatically detected runtime customization conflict, the runtime customization conflict being caused by an error that has occurred due to an inconsistency in runtime logic;
    utilizing a computer processor that is a component of the computer to identify, from a plurality of customizations of a core application operating on separate and distinct computing devices, a customization that is responsible for creating the automatically detected runtime customization conflict; and
    transmitting, over a network to an entity responsible for the identified customization, a collection of data related to the customization conflict.

8. A customization conflict management system, comprising:
    a network-based service component that receives a remotely transmitted indication of a conflict, the conflict being caused by a metadata error created by a first customization of a core application, the metadata error being an inconsistency created when the first customization has caused a change to a static metadata component, the static metadata component being depended upon by a second customization of the core application, the first customization operating on a first computing device that is separate and distinct from a second computing device upon which the second customization operates;
    a database of conflict corrections;
    a computer processor that identifies, from the database of conflict corrections, a customization correction configured to remedy the conflict; and
    wherein the network-based service component transmits, over a network, a record of the customization correction for processing to correct the metadata error.

9. The system of claim 8, wherein the conflict is a runtime conflict.

10. The system of claim 8, wherein the change to the static metadata component is an elimination of a particular method from a class, the particular method being depended upon by the second customization.

11. The system of claim 8, wherein the change to the static metadata component is an elimination of a field.

12. The system of claim 8, wherein the change to the static metadata component is an addition of a control to a form.

13. The system of claim 8, wherein the change to the static metadata component is a change to a static property.

* * * * *